(12) United States Patent
Contell Albert et al.

(10) Patent No.: US 9,445,626 B2
(45) Date of Patent: Sep. 20, 2016

(54) CITRUS JUICE MACHINE

(71) Applicant: ZUMMO INNOVACIONES MECANICAS, S.A., Moncada, Valencia (ES)

(72) Inventors: Eugenio Contell Albert, Valencia (ES); Jorge Martinez Roca, Valencia (ES)

(73) Assignee: ZUMMO INNOVACIONES MECANICAS, S.A., Moncada, Valencia (ES)

( * ) Notice: Subject to any disclaimer, the term of this patent is extended or adjusted under 35 U.S.C. 154(b) by 549 days.

(21) Appl. No.: 13/927,371

(22) Filed: Jun. 26, 2013

(65) Prior Publication Data

US 2013/0340632 A1 Dec. 26, 2013

(30) Foreign Application Priority Data

Jun. 26, 2012 (ES) .................................. 201230986

(51) Int. Cl.
*A47J 43/14* (2006.01)
*B30B 9/02* (2006.01)
*A23N 1/00* (2006.01)
*A47J 19/02* (2006.01)

(52) U.S. Cl.
CPC ................ *A23N 1/003* (2013.01); *A47J 19/02* (2013.01)

(58) Field of Classification Search
CPC ...... A47J 19/02; A47J 19/027; A47J 19/022; A47J 10/022; A23N 1/003
USPC .................................... 99/501–510; 100/213
See application file for complete search history.

(56) References Cited

U.S. PATENT DOCUMENTS

| | | | | |
|---|---|---|---|---|
| 2,199,876 A | * | 5/1940 | Brown .................... | A23N 1/003 100/105 |
| 2,274,020 A | * | 2/1942 | Weightman ............ | A23N 1/003 99/485 |
| 2,365,832 A | * | 12/1944 | Monroe ................ | A23N 1/003 221/183 |
| 2,528,533 A | * | 11/1950 | McCulloch ............ | A23N 1/003 100/110 |
| 2,531,026 A | * | 11/1950 | Cadella .................. | A23N 1/003 100/125 |
| 2,687,085 A | * | 8/1954 | Koffler .................... | A23N 1/003 100/105 |
| 3,858,500 A | * | 1/1975 | Rohm .................... | A23N 1/003 99/504 |
| 4,974,505 A | * | 12/1990 | Torrisi .................... | G07F 13/00 221/265 |
| 2008/0028943 A1 | * | 2/2008 | Lee ........................ | A47J 19/02 99/282 |

FOREIGN PATENT DOCUMENTS

EP          0594525 A1 *  4/1994  ............. A23N 1/003

* cited by examiner

*Primary Examiner* — Dana Ross
*Assistant Examiner* — Hemant Mathew
(74) *Attorney, Agent, or Firm* — Lucas & Mercanti, LLP

(57) ABSTRACT

Citrus juice machine with a fruit feed chute, fruit cutting and squeezing means and a peel collection tray. The cutting and squeezing means have a fruit reception cup, located below the fruit feed chute; devices to initiate the rotation of the cup between a vertical fruit reception position and an inverted position; a horizontal tilting blade facing the rotating trajectory of the cup to cut the fruit in an upper and lower half; a retaining stop for the upper half of the fruit; a ramp to support the lower half of the fruit during the rotation of the cup from its vertical position to an inverted position; a squeezing ball located below the cup.

10 Claims, 10 Drawing Sheets i j k l q r s t

CITRUS JUICE MACHINE

CROSS-REFERENCE TO RELATED APPLICATIONS

This application claims the priority of ES 201230986 filed Jun. 26, 2012, which is incorporated by reference herein.

FIELD OF THE INVENTION

The present invention relates to a citrus juice machine of the variety comprising a fruit feeder, cutting means which serve to chop the fruit in two halves, squeezing means which serve to juice the two halves of the fruit and a collection tray for the peel of said fruit halves after being squeezed.

BACKGROUND OF THE INVENTION

Citrus juice machines with a cutting blade, against which the fruits are pushed in order to be divided into two halves, are already known. Each of the two halves are collected by two cups, which face and compress them against two squeezing balls, from which the peels fall into a collection tray once the squeezing is complete.

Although they allow the two halves to be juiced at the same time, these machines present the disadvantage of being relatively large because they have two cups and two juicing balls, which prevents them from being installed in establishments where there is little space available.

SUMMARY OF THE INVENTION

The object of the present invention is a fruit juice machine, of the variety initially mentioned, which is small in size in relation to the size of traditional machines, thus facilitating its installation in establishments with less available space.

The machine, object of the invention, is of the variety comprising a fruit feed chute, fruit cutting and squeezing means and a collection cup for the peel.

The fruit cutting and squeezing means comprise a single fruit reception cup and a single squeezing ball.

The fruit reception cup is located below the fruit feed chute and is related to means which initiate its rotation between a vertical fruit reception position and an inverted position. The cutting means also include a horizontal tilting blade that faces the rotating trajectory of the cup, to cut the fruit in an upper and lower half. The upper half of the two halves is intercepted by a retaining stop, whilst the lower half is dragged by the cup during its rotation from the vertical position to the inverted position, resting and being conducted by a ramp located below the cup. The squeezing ball is located below the cup, the machine also including means to vertically displace the cup in an inverted position and the ramp upon which the fruit rests, in a synchronized manner, from the upper inverted position of said cup to a lower position wherein the lower half of the fruit housed in said cup is pressed against the squeezing ball.

The means to initiate the rotation of the cup comprise a horizontal rotating axis, on which said cup is mounted, a pinion joined together with said axis and a vertical rack which can be vertically displaced, to which the pinion is geared. The means to vertically displace the cup are formed by a rail bearing the axis of the cup which can be vertically displaced along vertical guides between upper and lower limit positions, wherein the cup is found, respectively, in the upper and lower inverted positions. The rail is pushed towards the upper position by means of a spring.

The aforementioned vertical rack is part of a vertical plate mounted between vertical guides and related to a motor mechanism. This vertical plate may be displaced along the aforementioned guides along the length of a vertical trajectory which comprises an upper section, along which it initiates the rotation of the cup, between the upper vertical and inverted positions and a lower section, along the length of which it drags the rail and the cup between the upper and lower inverted positions of said cup.

The fruit feed chute is composed of a fruit conducting channel and a fruit supplying platform. The platform is supported by a vertical piston rod which rests on a magnet joined with the plate of the rack by means of a bent arm when said rack is at the highest point of its vertical trajectory. The fruit feed chute is synchronized in such a way that it feeds an orange every other time the cup travels, corresponding to the squeezing of the two halves of an orange.

The blade designed to cut the fruit is mounted onto a horizontal axis, upon which it may tilt transversally between minimum and maximum inclination positions. This axis bears a probe which is retained, with the blade in the minimum inclination position, through a releasable rear stop and is also propelled by means of a spring towards the minimum inclination position of the blade. The probe receives the action of the plate of the rack when this plate reaches the highest point of its vertical trajectory, in order to initiate the tilting of the blade from the maximum inclination position to the minimum inclination position.

The synchronization mechanism of the platform with the blade is composed of an auxiliary wheel 30 and is mounted onto a horizontal axis bearing a toothed wheel upon which a ratchet acts, mounted onto the plate of the vertical rack, when said plate reaches the highest point of its vertical trajectory.

A horizontal rail bearing the rear stop of the probe is mounted onto the axis bearing the auxiliary wheel 30 and may be displaced longitudinally between the front and rear positions. The front position defines a front stop for the bent arm just as the rear stop for the probe, when the plate of the rack is displaced from the highest position of its vertical trajectory. The rail may be displaced from its rear position towards the front position by means of the toothed wheel and ratchet whilst it may be displaced in the opposite direction by means of a spring.

The ramp supporting the lower half of the fruit dragged by the cup is mounted onto a skid which may be displaced between vertical guides; a bearing is located on this skid through which it rests on the periphery of a vertical plate, rotating around a horizontal axis, presenting a contour which determines the vertical displacement of the bearing.

BRIEF DESCRIPTION OF THE DRAWINGS

The attached drawings are a non-limiting example of a machine built according to the invention.

DETAILED DESCRIPTION OF THE INVENTION

Figure 1:
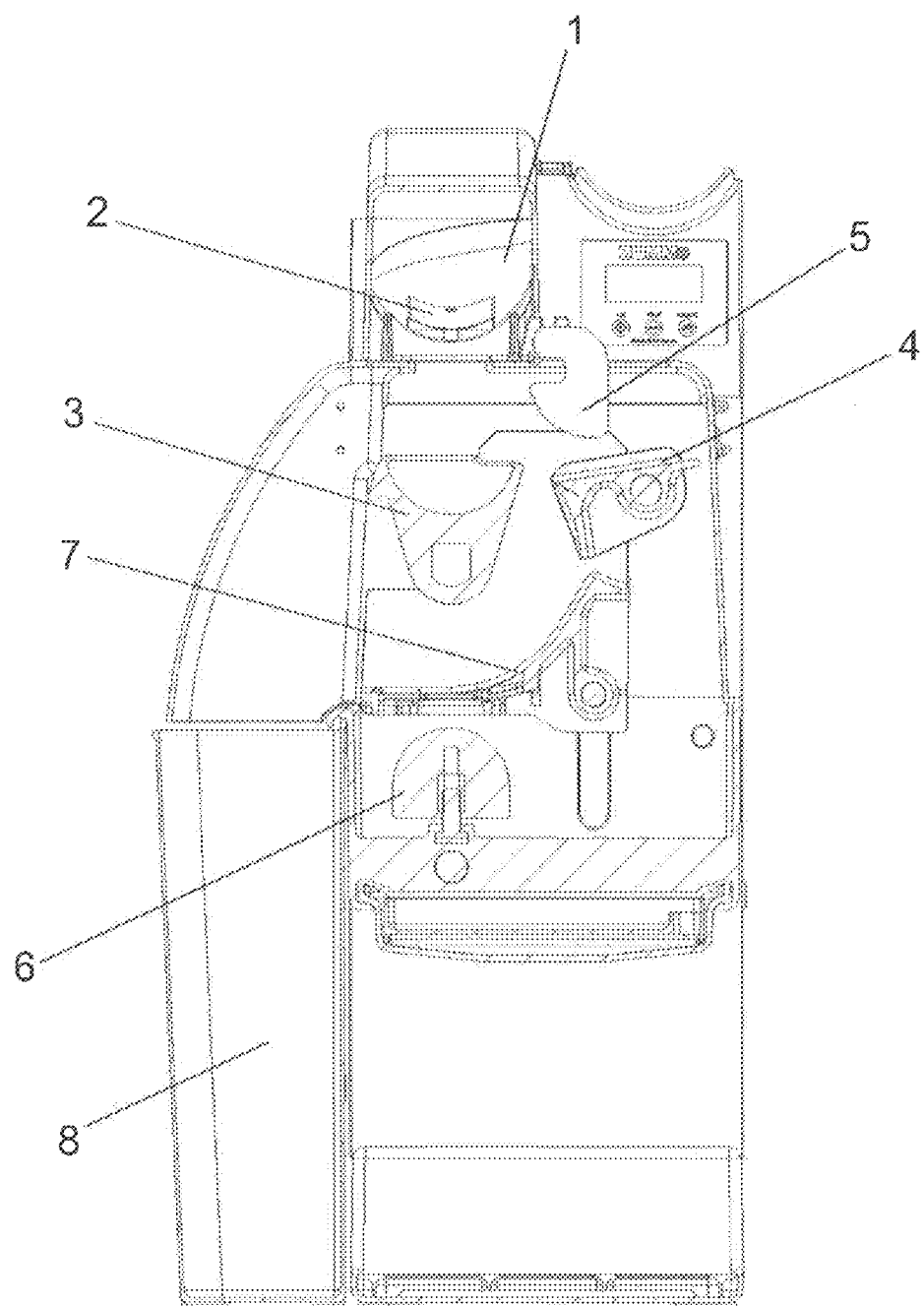
FIG. 1 is a front perspective of the juice machine, wherein the front cover has been left out in order to show the various components by means of which the cutting and squeezing of fruit is carried out.

The characteristics and operation of the machine, object of the invention, are presented below in more detail, with reference to example embodiment represented in the drawings attached.

The machine shown in FIG. 1 comprises a fruit feed chute composed of a fruit feed channel 1, which is intercepted by a platform 2, in charge of controlling the fruit supply. A fruit reception cup 3, a horizontal tilting blade 4 to cut the fruits collected by the cup 3 into an upper and lower half, a retaining stop 5 of the upper half of the fruit cut by the blade 4, a squeezing ball for the fruit halves cut by the blade 4 and a ramp 7 to conduct the fruit halves cut by the blade 4 towards the squeezing ball 6 are arranged below the fruit feed chute. Lastly, the machine has a tray 8 to collect the peel.

The various squeezing steps will be presented below, with reference to FIG. 2,

As shown in position "a" of a previous step, an orange 38 is placed in the cup 3, whilst other oranges 39 are located in channel 1, retained by platform 2.

The activation of the action motor by means the rod 16 and crank 17 set, as presented below, will initiate the rotation of the cup 3 towards the right, position "b", whilst the blade 4 remains in a fixed position. As a result, the orange rests on and is displaced onto the blade and is cut in two halves, an upper half 40 and a lower half 41.

The stop 5 retains the upper half 40 of the orange and allows the passage of the lower half 41, dragged by the cup 3.

In position "c", the stop 5 retains the upper half orange 40, whilst the lower half 41 continues its displacement, resting on ramp 7, which prevents it from falling from the cup 3, until this cup reaches the inverted position, with the lower half orange 41 resting on ramp 7, step "c". Next, the cup 3 and the ramp 7 descend simultaneously until they rest on and compress the lower half orange 41 against the squeezing ball 6, step "e". Once squeezing is complete, the cup 3 ascends, step "f" and leaves the peel 41' on the squeezing ball 6, whilst the ramp 7 remains still. The rotation of the cup 3 then begins, step "g" towards the initial vertical position, whilst the ramp 7 begins to ascend, step "h" and extracts the peel 41', steps "i" and "j", in the second of which the cup 3 has reached its upper position. Next, the cup 3 and the blade 4 rotate in a synchronized manner, step "k" and the upper half orange 40 is released from the stop 5 and falls inside the cup 3. The platform 2 has descended and the following orange 39 is placed in the feed position.

Next, the half orange 40 is placed in the cup 3 and the aforementioned process begins once more, acting as a cycle, step "l", dragging the peel 41', which finally comes out, step "m", towards the tray 8 sliding along ramp 7, when the cup reaches the inverted position.

Next, the squeezing process is repeated, the cup 3 descends "a", and compresses the half orange 40 against the squeezing ball 6 and from this moment, the cup 3 ascends, step "o" and leaves the peel on ramp 7. Position "p" shows how the cup initiates the rotation continuing with steps "q" and "r", in the second of which the extraction of the peel begins. When reaching the position "s", the cup receives a new fruit, in order to begin the process from the initial position "a".

The entire process described above is carried out by means of the mechanism shown in FIGS. 3 to 6, which will be described below.

The fruit reception cup 3 is mounted onto a first horizontal rotating axis 9, which is joined together with a pinion 10 geared to a vertical rack 11 carved in a vertical plate 12. The first axis 9 of the cup is also mounted onto a rail 13. The vertical plate 12 and the rail 13 are mounted between railing guides 14. The rail 13 may be displaced on the vertical guides 14 between upper and lower limit positions, propelled towards the first by means of a spring 15.

Figure 4:
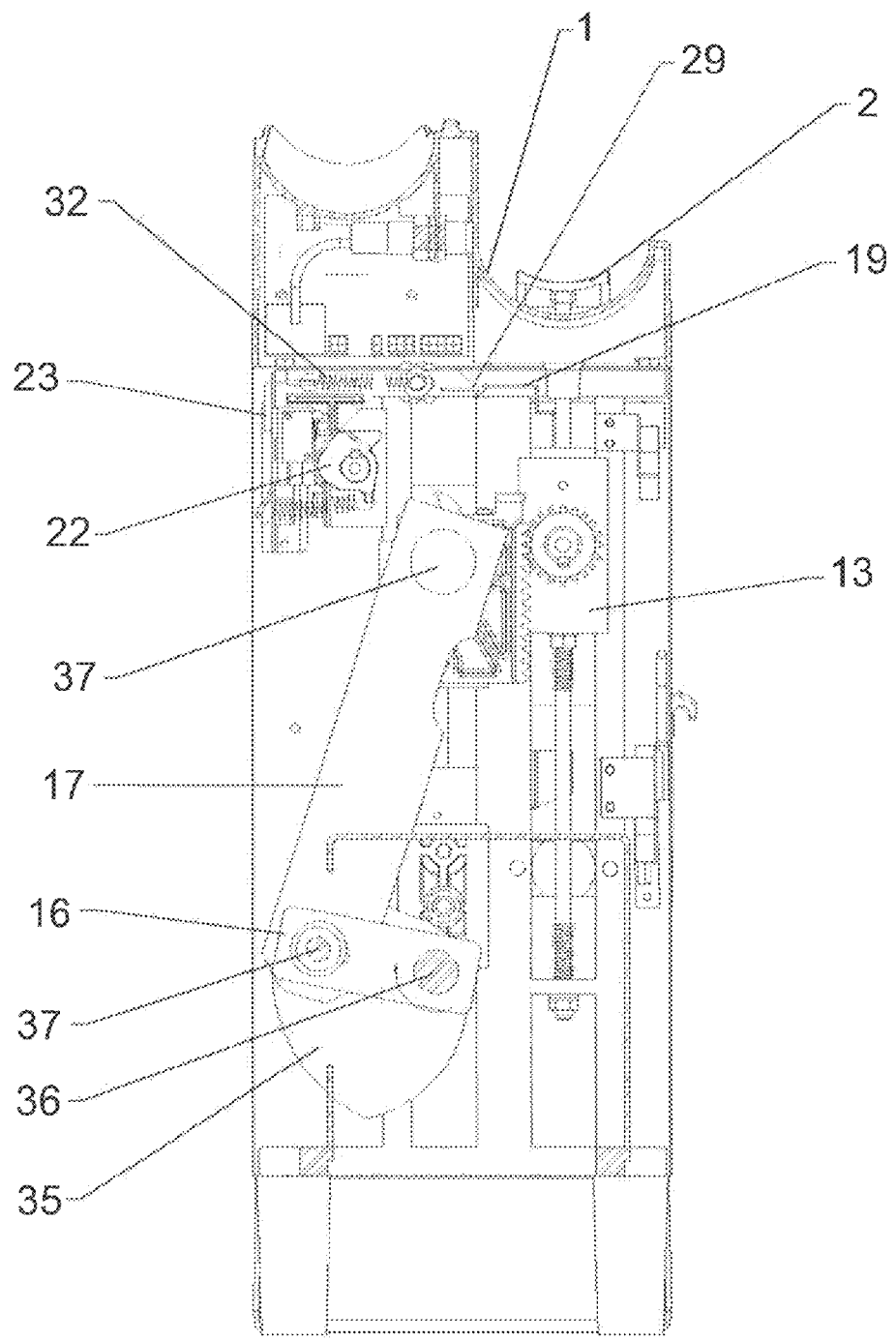
FIGS. 4 to 6 show the mechanism of the machine, object of the invention, in successive working steps.

The vertical plate 12 is related to a motor mechanism, not shown, by means of a rod 16 and crank 17 set, FIG. 4, with which the displacement of the plate 12 along the length of a vertical trajectory comprising an upper section is achieved, wherein the gearing between the rack 11 and the pinion 10 takes place and initiates the rotation of the cup 3 between the vertical and inverted positions and a lower section, along which the rail 13 is dragged, and with it the cup 3 in the inverted position, between the upper and lower inverted positions.

Figure 3:
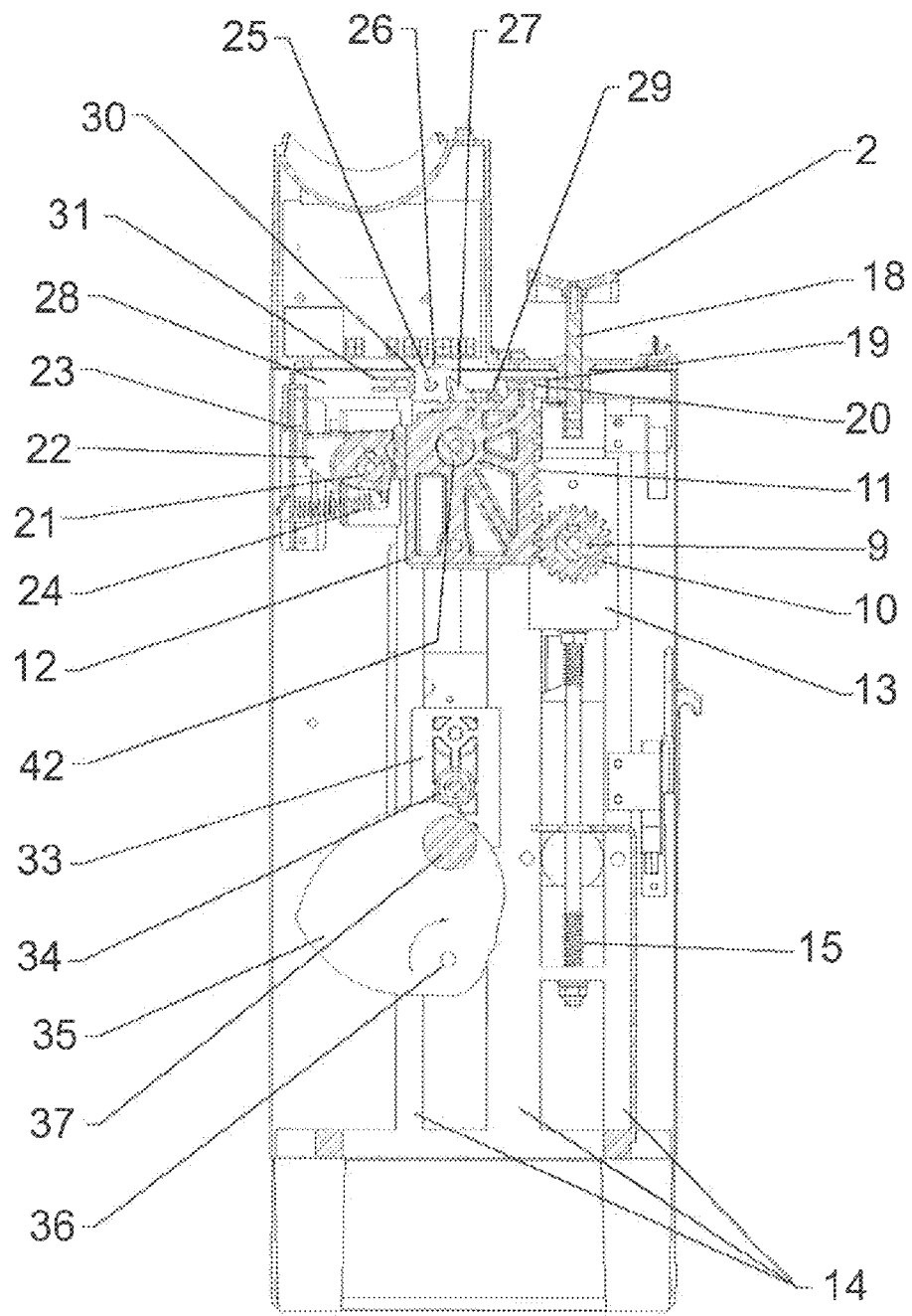
FIG. 3 is a rear view of the machine, without the cover, to show the action mechanisms of the various components by means of which the cutting and squeezing of fruit is carried out."

As shown in FIG. 3, the platform 2 of the fruit feed chute is supported by a vertical piston rod 18 that rests on a magnet 20 joined to the plate 12 by means of a bent arm 19 when said rack is at the highest point of its vertical trajectory.

The horizontal tilting blade 4 is mounted onto a second horizontal axis 21, with which said blade may be tilted transversally between the positions of minimum and maximum inclination. The second axis 21 of this blade bears a probe 22 that is retained when the blade is in the minimum inclination position, by means of a releasable upper stop 23, and is propelled by means of a first spring 24 towards the maximum inclination position of the blade. The probe 22 receives the action of the plate 12, FIG. 3, when said plate reaches the highest point of its vertical trajectory.

Figure 5:
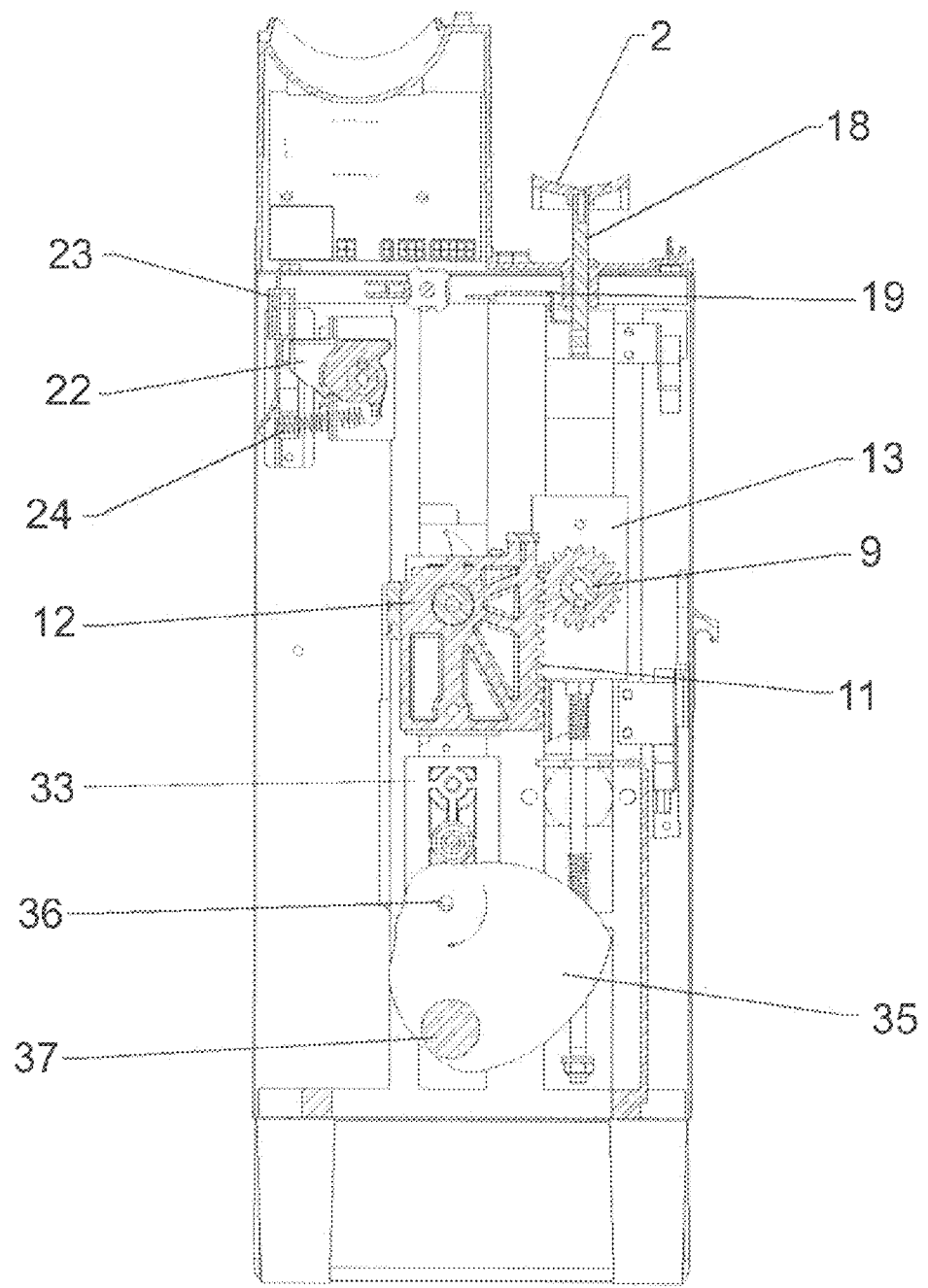
Figure 6:
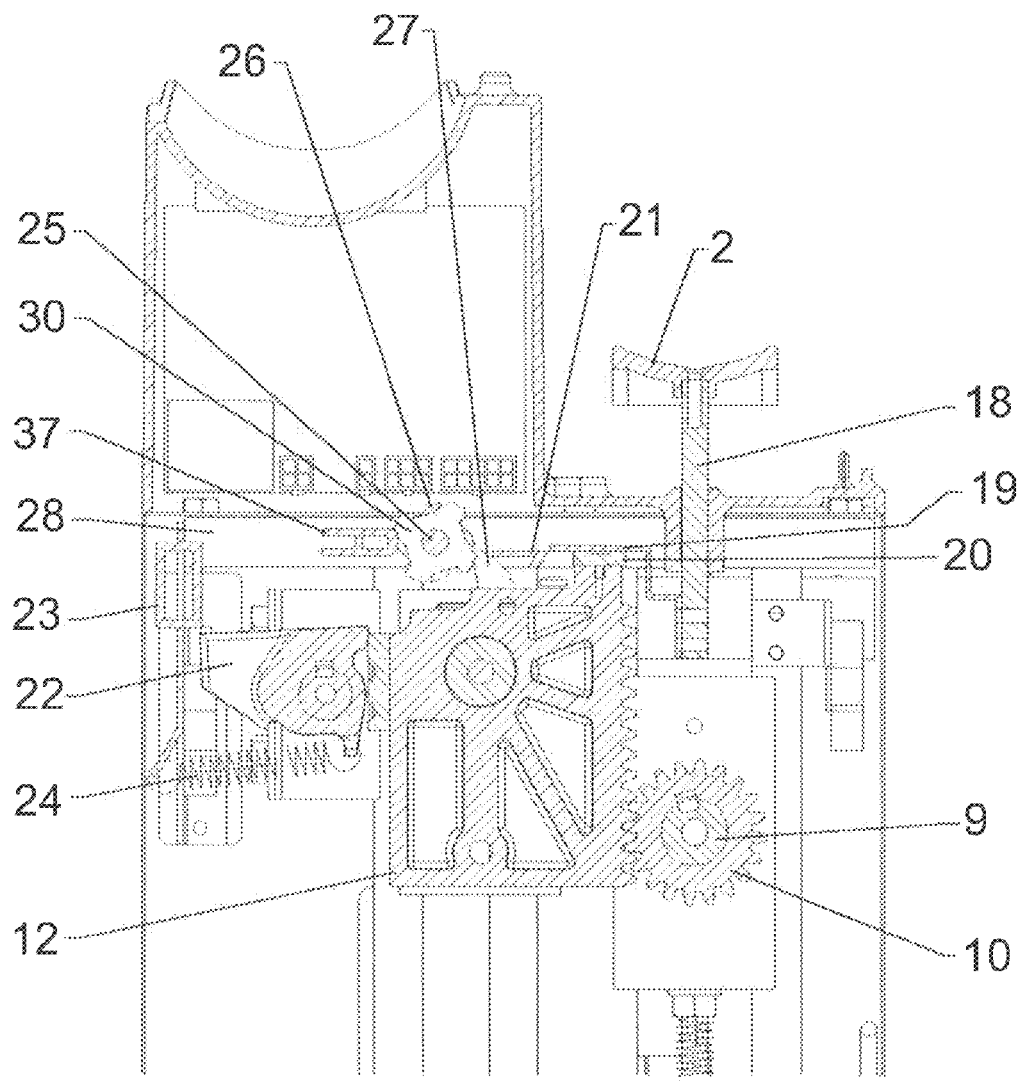

The synchronization mechanism of the platform with the blade is composed of an auxiliary wheel 30, FIGS. 4 and 5, which bears a toothed wheel 26 on which a ratchet 27, mounted onto the vertical plate 12, acts, when said plate reaches the highest point of its vertical trajectory, as better shown in FIG. 6. In addition, a horizontal rail 28 is mounted onto a third axis 25, which bears the rear stop 23 for the probe 22. This rail may be displaced longitudinally between the front and rear positions. In the front position, shown in FIG. 3, the rear stop 23 acts against the probe 22 and defines a front stop 29 for the bent arm 19 when the vertical plate 12 does not occupy its upper position, FIGS. 4 and 5. On the contrary, when the horizontal rail 28 is in its rear position, the stop 23 will stop acting on the probe 22, whilst the bent arm 19 will stop resting on the stop 29. The rail 28 may be displaced from the rear to the front position by means of the auxiliary wheel 30, FIG. 6, which is joined together with the third axis 25 and the pinion 26, this auxiliary wheel acting on a supporting piece 31, joined together with the rail 28, each time the ratchet 27 acts on the toothed wheel 26. The rail 28 may be displaced in the opposite direction by means of a second traction spring 32, FIG. 4. The rail 28 has a longitudinal slot, not shown, through which the third axis 25 passes and with respect to which said rail may be displaced longitudinally between the previously described front and rear positions.

The supporting ramp 7, FIG. 1, is mounted onto a skid 33, FIGS. 3 and 5, which may be displaced between the vertical guides 14. A bearing 34 is located on this skid, which rests on the periphery of a cam plate 35 which rotates around a fourth horizontal axis 36 and is related to a rod 16 and crank 17 set by means of the articulation 37 between the rod 16 and crank 17, FIG. 4. In turn, the crank 17 is related to the cam plate 12 by means of a fifth axis 37'.

The plate 35 presents a contour which determines, by means of the rotation around the fourth axis 36, the vertical displacement of the bearing 34 and with it, the rotation of the skid 33 and supporting ramp 7.

The crank 17 is connected to the vertical plate 12 by means of a core or articulation bolt 42.

Figure 2:
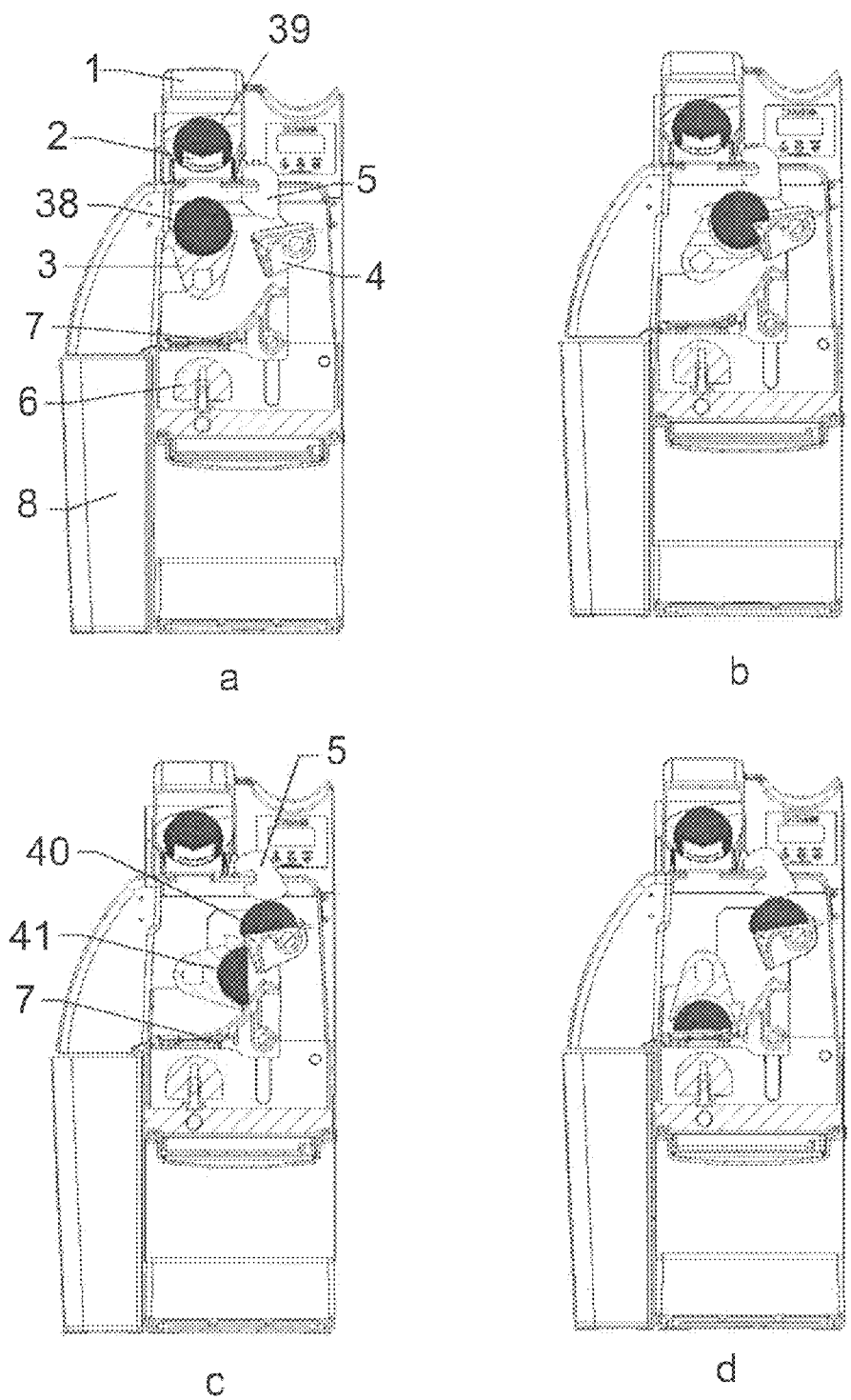
FIG. 2 represents, in a schematic manner, the process of cutting and squeezing a piece of fruit.
Figure 2:
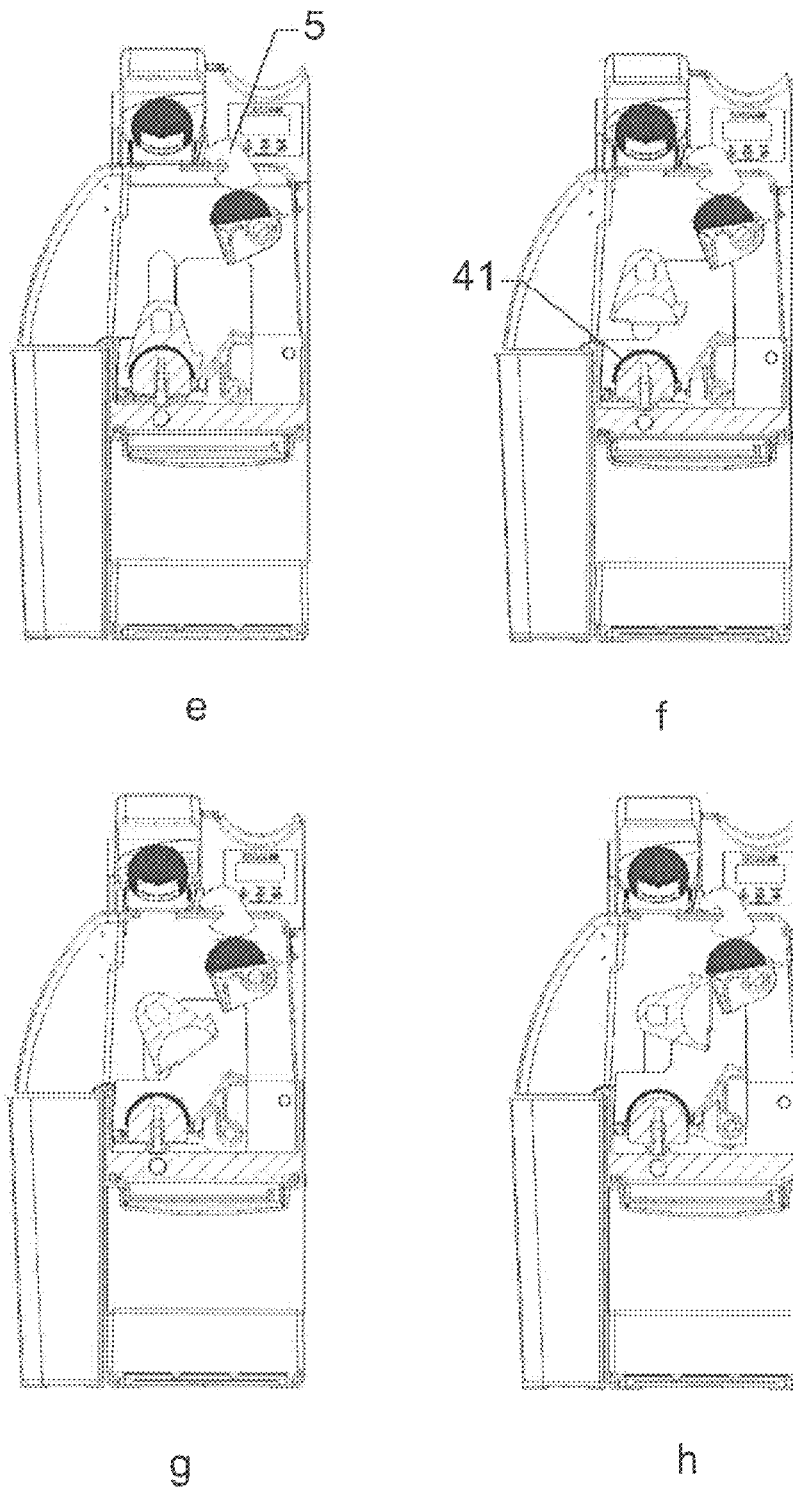
Figure 2:
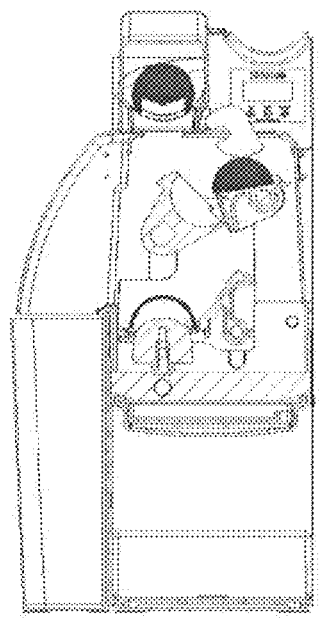
Figure 2:
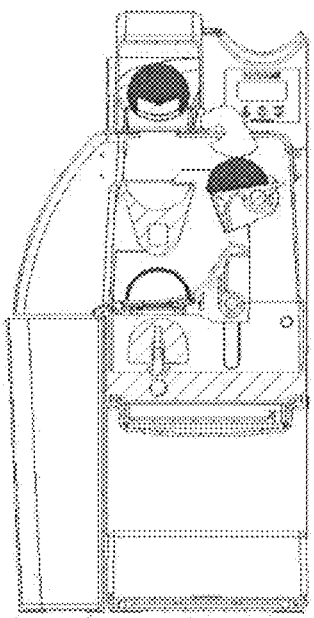
Figure 2:
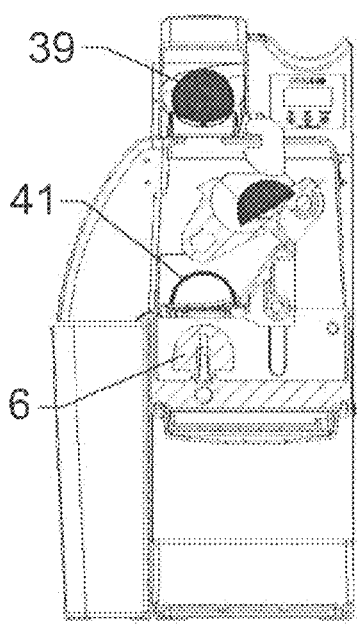
Figure 2:
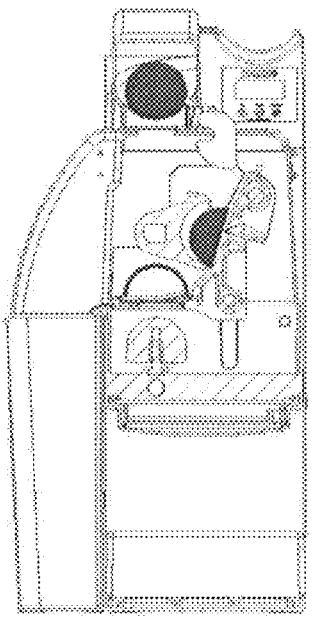
Figure 2:
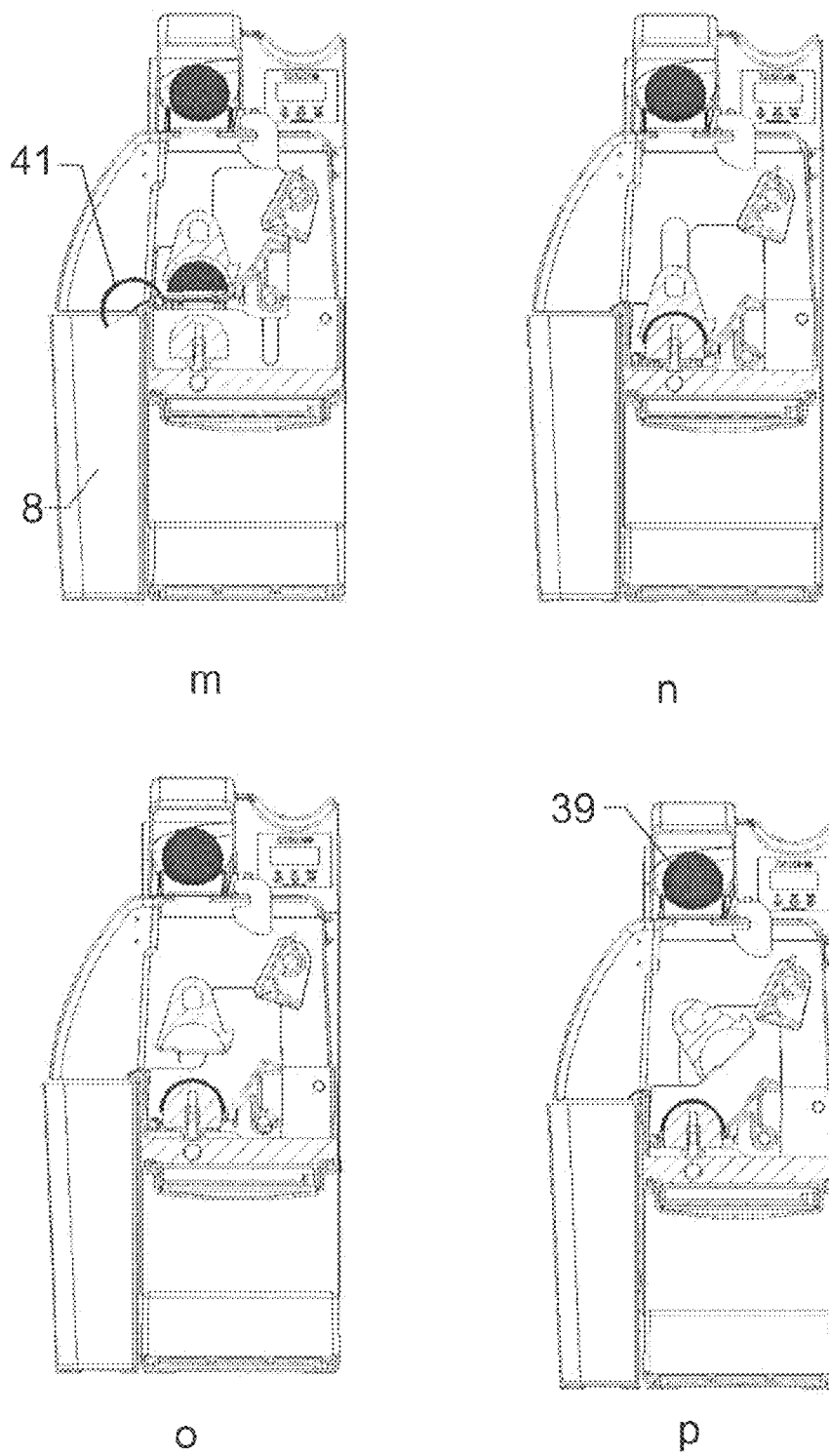
Figure 2:
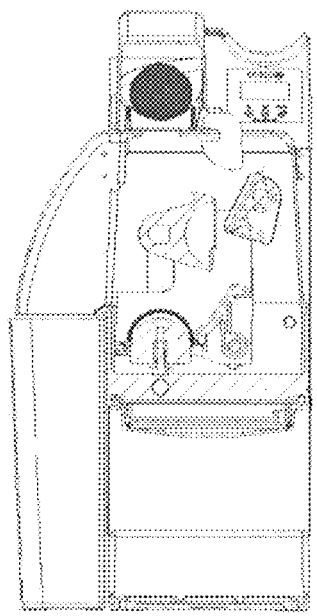
Figure 2:
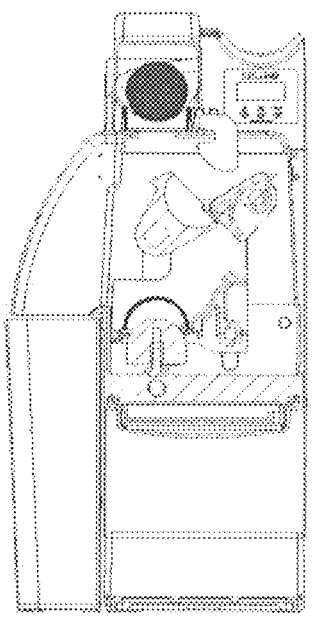
Figure 2:
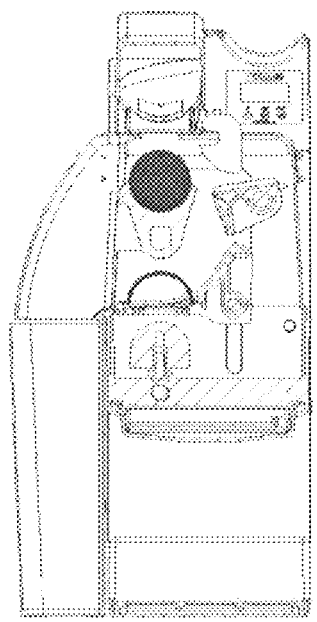
Figure 2:
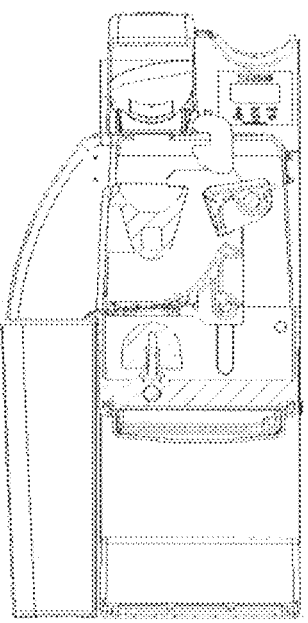

The rod 16 and crank 17 set drives the mechanism represented in FIGS. 3 and 6, by means of which the steps described with reference to FIG. 2 are carried out. The operation of this mechanism takes place based on the fourth axis 36, which constitutes the motor axis and on which the cam plate 35 is mounted.

In the initial position, shown in FIG. 3, which corresponds to step "a" in FIG. 2, the feed platform 2 rests, by means of the piston rod 18 and bent arm 19, on the magnet 20 joined together with the vertical plate 12. The pinion 10, joined together with the first axis 9 of the cup 3, is geared to the vertical rack 11. The probe 22, joined together with the blade, rests on the vertical plate 2. The auxiliary wheel 30, with the toothed wheel 26 and ratchet 27, keep the rack 28 displaced to the right. The bearing 34 of the skid 33 rests on the edge of the cam plate 35.

The descent of the vertical plate 12, FIG. 4 is initiated by the rod 16-crank 17 set, FIG. 4, connected to the driving motor by means of the fourth axis 36. The platform 2 rests on the front stop 39; the probe 22 remains resting on the stop 23 and the blade remains fixed whilst the orange is cut. The descent of the vertical plate 12 initiates, by means of the vertical rack 11, the rotation of the pinion 10 and in turn, of the cup 3. The bearing 34 of the skid 33 rests on the edge of the cam plate 35, keeping the ramp 7 in the highest position.

When the vertical plate initiates the 180° rotation of the pinion 10, FIG. 4, the cup is in the inverted position and, along with the ramp 7, begins to descend simultaneously until reaching the position shown in FIG. 5, wherein the spring 15, FIG. 3, is compressed in order to subsequently initiate the ascent of the rail 13 of the cup, The fourth axis 26, connected to the drive motor, continues to rotate and the vertical plate 12 ascends, as well as the rail 13 of the cup, given the action of the spring 15; the rotation of the cam plate 35 causes the ascent of the bearing 34 of the skid 33.

When the vertical plate 12 reaches its upper position, FIG. 6, it elevates the platform 2 by means of the bent arm 19 and the piston rod 18. The vertical plate 12 pushes the probe 22 and the ratchet 27 rotates the toothed wheel 26 and in turn, the auxiliary wheel 30 which displaces the horizontal rail 28 towards the left, by means of the supporting piece 31, in such a way that the rear stop 23 stops acting on the probe 22. When the vertical plate 12 descends once again, the platform 2 and the blade 4 also descend.

Whilst the vertical plate 12 is descending, the probe 22 and the blade are inclined because the horizontal rail 28 does not prevent said inclination and because the spring 24 causes the traction of the probe 22. The platform 2 descends, There is a moment wherein the blade makes contact and does not descend any more. The platform 2 also descends until its limit. The pinion 10 finishes rotating, FIG. 4 and starts lowering said cup and ramp 7 simultaneously, until they reach their lowest point, FIG. 5. Whilst the movement of the mechanism continues, the elevation of the vertical plate from the position in FIG. 5 to the position in FIG. 4 begins. The cup ascends in the inverted position and the skid 13 will begin to ascend. The platform 2 also begins to ascend and the probe 22 of the blade begins to rotate, pushed by the vertical plate 22. The cup begins its rotation until the vertical plate 12 reaches the position in FIG. 3, wherein said cup is in its vertical position, at its most elevated point.

The ratchet 27 causes the rotation of the toothed wheel 26 and auxiliary wheel 30. The probe 22 locates the blade in an almost horizontal position in order to begin a new cutting phase.

The operation of the juice machine, object of the invention, will be explained with reference to FIG. 2, wherein successive squeezing sequences are represented, from an initial position a until a final position d.

Position a represents the machine in which, by means of a previous operation, there is an orange 38 located on the cup 3, whilst other oranges 39 are found on the feed ramp 1, FIG. 1 but retained by the platform 2. In this situation, the platform 2 rests on the magnet 20 by means of the bent arm 19, as shown in FIG. 2. At the same time, the pinion 10 of the axis 9 of the cup is geared to the rack 11. The probe 22 is retained by the stop 23 and its front part rests on the plate 12. The auxiliary wheel 30 is in a position which causes the rail 28 to be displaced towards the right.

By means of the rod-crank set 17, the plate 12 is displaced in a descending direction, the rack 11 causing the rotation of the pinion 10 and in turn, the rotation of the cup 3 towards the right, as shown in step b of FIG. 3, a situation wherein the blade 4, FIG. 1, remains fixed, causing the cutting of the orange in two halves, an upper half 40, step c, which is restrained by the retaining stop 5 and a lower half 41, which is dragged by the cup, step c, resting and being displaced upon ramp 7, which remains fixed. When the pinion 10, FIG. 2, has rotated 180°, the cup 3 is in the inverted position, step d of FIG. 3, thus initiating the simultaneous descent of the cup 3 and skid 7, pressing the lower half of the orange 41 against the squeezing ball 6, step e of FIG. 2. As of this moment, the cup 3 begins the vertical ascent and leaves the peel of the lower half 32 on the squeezing ball 6, as shown in step f, whilst the ramp 7 remains in its lower position. The cup 3, step g, returns to its initial position, whilst the rest of the components remain still. As represented in step h, the cup continues its ascending path and the ramp 7 begins to ascend, extracting the peel of the squeezed lower half. As shown in step i, the cup 3 continues its ascending path and the ramp 7 begins to ascend, completing the extraction of the peel from the lower half of the squeezed orange. In step j, the cup 3 has completed its ascent and the peel of the squeezed lower half of the orange is on the ramp 7. In step k, the cup 3 and blade 4 rotate in a synchronized manner. The upper half orange 40 which was immobilized by the retaining stop 5 is released and falls in the cup 3, the moment in which feed platform 2 will has descended and the following orange has been placed in the feed position.

The upper half of the orange 40 has been placed inside the cup 3, step l and as said cup continues its rotation until reaching the inverted position of step in, it pushes the peel of the previously squeezed half orange towards the reception tray 8. Next, the cup would have descended as shown in step n, squeezing the half orange against the squeezing ball 6. In step o, the cup ascends vertically and leaves the peel on the ball, the ramp 7 remaining in its lower position. In step p, the cup 3 returns to its initial position, whilst the rest of the elements remain still. In step q, the cup continues its ascending path and the ramp 7 begins to ascend, extracting the peel of the squeezed half of the fruit. In step r, the cup continues to ascend and the ramp 7 also begins to ascend, extracting the peel of the squeezed half of the fruit. The blade 4 rotates upwards, in synchronization with the cup 3 and the platform 2 begins to ascend in such a way that the next orange, which is on said platform, ends up falling on the cup as shown in step s, to begin a new cycle. Step t shows the machine without fruit, in the position shown in FIG. 1.

All of the described steps are carried out by means of the mechanism shown in FIG. 3, through a driving motor connected to the axis 36 of the rod-crank 17 set, The profile of plate 35 ensures the position and displacement of ramp 7, FIG. 1, at all times.

The position and movement of the tilting blade 4 is secured by the probe 22, and action by means of plate 12, FIGS. 4 and 5 and spring 24. The position and movement of the cup 3 are defined by the displacement of the vertical plate 12, by means of the rod-crank 17 set.

The invention claimed is:

1. A citrus juice machine comprising:
 a fruit feed chute;
 a fruit cutting and squeezing means, the fruit cutting and squeezing means comprising:
  a fruit reception cup located below the fruit feed chute,
  means for initiating rotation of the fruit reception cup between a vertical fruit reception position and an inverted position,
  a horizontal tilting blade facing the rotation trajectory of the fruit reception cup to cut the fruit in an upper half and a lower half,
  a retaining stop for the upper half of the fruit,
  a ramp to support the lower half of the fruit during the rotation of the fruit reception cup from the vertical fruit reception position to the inverted position,
  a squeezing ball located below the cup, and
   means for vertically displacing the cup in the inverted position and the ramp in a synchronized manner from an upper inverted position of the fruit reception cup to a lower inverted position pressing the lower half of the fruit housed in said cup against the squeezing ball; and
  a peel collection tray.

2. The machine according to claim 1, wherein the means for initiating rotation of the cup comprise a horizontal rotating axis, upon which said cup is mounted, a pinion joined together with said axis and a vertical rack which may be vertically displaced, to which said pinion is geared.

3. The machine according to claim 1, wherein the means for vertically displacing the cup comprise a rail bearing an axis of the cup which may be displaced on vertical guides between upper and lower limit positions, wherein the cup is found, respectively, in the upper inverted position and the lower inverted position and the rail is propelled towards the upper inverted position by means of a spring.

4. The machine according to claim 2, wherein the vertical rack forms part of a vertical plate, mounted between vertical guides and related to a drive mechanism, the vertical plate may be displaced on said guides at a highest point of a vertical trajectory, comprising an upper section, along which rotation of the cup between the upper inverted vertical position and a lower section is initiated, along which the rail and cup are dragged between the upper inverted position and the lower inverted position of said cup.

5. The machine according to claim 1, wherein the fruit feed chute has a fruit conducting channel and a fruit supplying platform, the platform being supported by a vertical piston rod resting on a magnet joined together with a plate of a rack by means of a bent arm, when said rack is at the highest point of a vertical trajectory.

6. The machine according to claim 1, wherein the blade is mounted onto a horizontal axis upon which may tilt transversally between positions of minimum and maximum inclination, the axis bears a probe which is retained, with the blade in the minimum inclination position, by means of a releasable upper stop propelled by means of a spring towards the maximum inclination position of the blade, said probe receiving the action of a vertical plate of a rack when said plate reaches a highest point of its vertical trajectory, to initiate the tilting of the blade from the maximum inclination position towards the minimum inclination position.

7. The machine according to claim 6, wherein the retaining stop is mounted onto a horizontal axis bearing a toothed wheel upon which a ratchet, mounted onto the vertical plate of the rack, acts, when said plate reaches a highest point of its vertical trajectory.

8. The machine according to claim 6, wherein a horizontal rail is mounted onto the axis bearing the retaining stop, which bears a rear stop of the probe and may be displaced longitudinally between a front and a rear positions, the first of which defines a front stop for a bent arm just as the rear stop for the probe, when the vertical plate of the rack is displaced from a highest position of its vertical trajectory, with the possibility of said rail being displaced from the rear to the front position by means of a toothed wheel and ratchet and in the opposite direction by means of a spring.

9. The machine according to claim 1, wherein the ramp supporting the lower half of the fruit is mounted onto a skid which may be displaced between vertical guides, a bearing being located on the skid, by resting on a periphery of a vertical plate rotating around a horizontal axis, which presents a contour determining a vertical displacement of the bearing.

10. The machine according to claim 4, wherein the plate making up the vertical rack and the vertical plate upon which a bearing of a skid is supported are related to a rod-crank set connected to a drive motor.

* * * * *